UNITED STATES PATENT OFFICE 2,312,196

METHOD OF MANUFACTURING ALCOHOL FROM PEAT

Antonie St.-Leger, Moscia-Ascona, Switzerland

No Drawing. Application April 29, 1940, Serial No. 332,399. In Switzerland May 24, 1939

3 Claims. (Cl. 195—41)

For the manufacturing of alcohol there is hardly any cheaper and more universal raw material to be found than peat. Peat really contains sufficiently great quantities of cellulose, and attempts have already been made to saccharify and to ferment peat. All such attempts have met with unsurmountable difficulties, due principally to the small yield obtained by the methods used. These methods generally consisted in treating the previously dried peat with mineral acids under pressure and at high temperatures for the purpose of saccharifying the cellulose and then treating the saccharified product with the usual alcoholic yeasts. But peat does not only contain cellulose, but also considerable quantities of amylaceous or gummous substances and often even greater quantities than cellulose. These substances, under certain conditions can also be saccharified but normally they escape the saccharimetric analysis carried out according to the usual methods with polarimeter or copper oxide. These substances have the disagreeable property of being much easier to carbonize with mineral acids than the cellulose itself. By the browning of these substances products of condensation and of polymerisation are formed with properties sufficiently antiseptic to destroy the ordinary yeast and, thereby, to prevent even the most carefully executed fermentation.

The method according to the invention remedies these inconveniences. It is characterized in that freshly dug peat, without its moisture having previously been eliminated is boiled under pressure with the addition of an acid solution which saccharifies the cellulose and the amylaceous and gummous substances without any noticeable browning, that the mass, at a temperature not exceeding that of the fermentation, is partially neutralized, and that the mass is then subjected to fermentation by alcoholic ferments and finally distilled.

In a preferred manner of carrying out the method ferments are chosen which are contained in the berries of certain shrubs of the order Rosaceae, especially of such genus growing in the subarctic regions such as, for instance, the *Rubus chamaemorus*. It is understood that other ferments, such as those of the ordinary leaven show a good result, at least in quality, if not in quantity. It is advisable to use relatively young, still-brown peat which is obtained from the upper layers of peat moors. In the method according to the invention this peat is used in a fresh state, without the moisture having previously been eliminated by drying or pressing. This moisture which could also be called "absorption water" may amount to 85 to 92% of the weight of the peat. The boiling is carried out in an acid medium. The proportion of acid, for instance, of sulphuric acid may be chosen between 1 and 1.2%. The boiling may be carried out over a naked fire or by means of steam. In the latter case the cooking must begin with a lower proportion of water resulting in a saving of acid.

Because fresh peat is used, the plant for carrying out the method must be located in the direct proximity of a peat moor, for such a low-cost raw material cannot be worked economically if it is to be conveyed to the plant from any distance.

The boiling, like the fermentation and the subsequent distilling may be continuously carried out by introducing, together with fresh raw material, part of the treated product into the cycle.

For the fermentation, the acid of the boiling quantity must be partly neutralized in order to reduce the percentage of acid to an amount harmless to the vitality of the ferments used. The concentration may preferably be chosen between 1.5 and 5 gr. acid per liter. The neutralizing must be carried out at a temperature not exceeding that of the fermentation, that is, a temperature which, according to the ferments used, does not exceed 10 to 40° centigrade. It has been found that the ferments of *Rubus chemaemorus*, for instance, withstands considerably higher temperatures than the ordinary alcoholic ferments and that with the ferments of *Rubus chemaemorus* the fermentation may be carried out at a temperature of 32 to 38° centigrade.

The partial neutralization of the acid used for boiling may advantageously be carried out with calcium carbonate which is often found in the subjacent layers of peat moors. The other substances forming these calcareous layers: aluminum, phosphates, magnesium, nitrogenous substances, etc., far from being injurious to the subsequent operation, favor, on the contrary, the fermenting by feeding the ferments.

The fermentation may be carried out in open vats. The duration varies from one hour to several days according to the ferments and the temperature used. The quantity of fresh ferments to be added may likewise vary within great limits. A proportion of 2 to 4% may be considered as normal for a discontinuous working.

After the fermentation, the whole mass is neutralized completely and then distilled. It has been observed that peat in a moist state, owing to its porosity, favors distillation.

After distilling, the mass may be filtered and the mother lye be used for a new boiling. The easily compressible residue containing, besides the cellulose not yet hydrolysed various nitrogenous substances, may be briquetted and used as a combustible or be subjected to a dry distillation to recover the by-products, such as ammonium sulphate, illuminating lighting gases, tars, etc., whereby the economy of the method is greatly increased.

The yield of alcohol may amount to 10 to 14 litres of absolute alcohol per 10 kilograms of dry substance, i. e., per ton of freshly dug peat.

*Example.*—1000 kilograms of brown peat freshly dug and containing about 100 kilograms of dry substance are treated in an autoclave with 500 litres of water and 18 kilograms of concentrated sulphuric acid. The autoclave is slowly heated by steam up to an autogeneous pressure of 3 atmospheres. This pressure is maintained for about 45 minutes. The gelatinous mass is then neutralized in a vat, where, after having cooled down to 20–25° centigrade, it is partly neutralized by means of calcium carbonate. This process must take place without the temperature exceeding 35° centigrade. The neutralizing is continued until the percentage of acid has sunk to about 0.3%. The partly neutralized mass is then subjected to fermentation, which is inoculated by adding about 3 kilograms of ferments from "*Rubus chamaemorus.*" This fermentation is continued during 24 hours at a temperature of 38° centigrade in an open vat. When the fermentation is finished the mass is completely neutralized and then distilled without previously filtering.

Yield: 12 litres of pure alcohol.

It is understood that the economy of the method may be improved by a continuous working and by recovering the by-products.

What I claim is:

1. In the manufacture of alcohol from peat, the process which comprises heating a mass of freshly dug peat and water, under autogeneous pressures within the range of about 3 to 4 atmospheres with a peat concentration of about 7 to 10 per cent dry substances and in the presence of about 1 to 1.2 per cent of mineral acid, for a time sufficient to saccharify the cellulose, amylaceous and gummy substances contained therein but insufficient to produce any noticeable browning of the mass, cooling and partially neutralizing the resulting mass, fermenting it with a yeast, completely neutralizing the fermented mass and distilling off the alcohol.

2. The process of claim 1 wherein said yeast is derived from berries of *Rubus chamaemorus.*

3. In the manufacture of alcohol from peat, the process which comprises heating a mass of freshly dug peat, containing its normal water content and added water, under autogeneous pressures within the range of about 3 to 4 atmospheres in the presence of about 1 to 1.2 per cent sulfuric acid, the water added being sufficient to produce a concentration of from about 7 to 10 per cent of dry substance in the mass, the heating being conducted for a time sufficient to saccharify the cellulose, amylaceous and gummy substances present but insufficient to produce any noticeable browning of the mass, cooling the mass to a temperature below 40° C., neutralizing to an acid concentration of about 0.2 to 0.4 per cent acid with a calcareous substance forming the subjacent layer of peat moors, then fermenting the mass with a yeast derived from the berries of *Rubus chamaemorus,* completely neutralizing the fermented mass and distilling off the alcohol without previous filtration.

ANTONIE ST.-LEGER.